Figure 1:
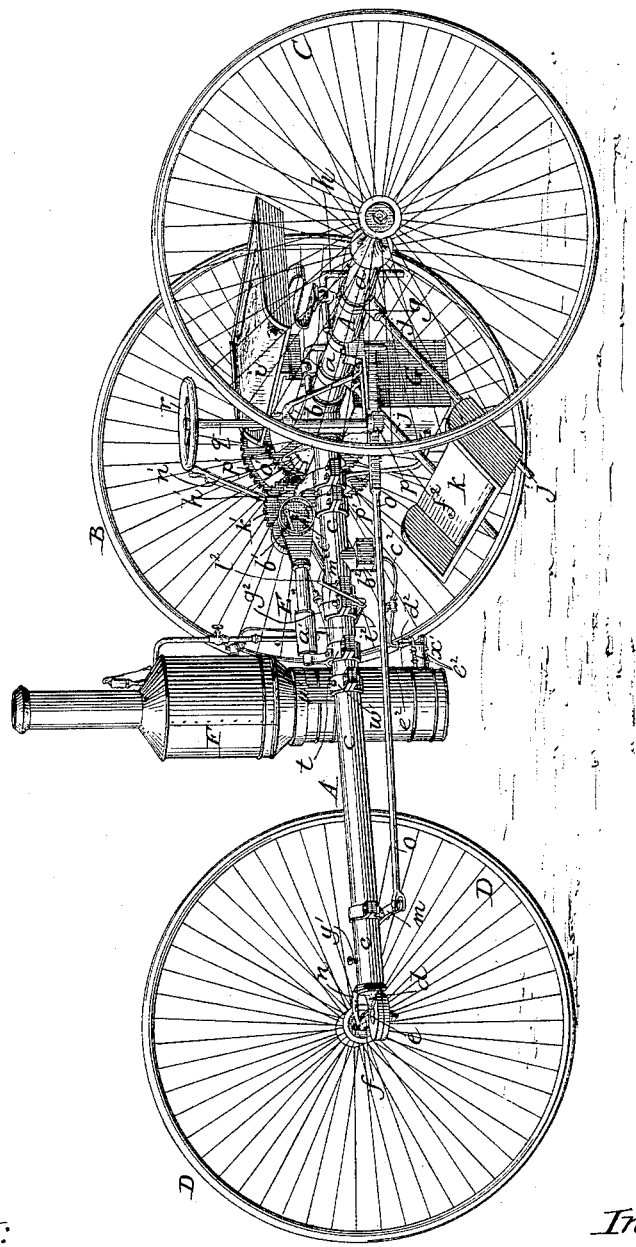

(No Model.) 2 Sheets—Sheet 1.

H. B. SMITH.
STEAM TRICYCLE.

No. 398,548. Patented Feb. 26, 1889.

Attest:
Sidney P. Hollingsworth
F. T. Chapman.

Inventor:
H. B. Smith
By his Atty.
Phil. T. Dodge (No Model.) 2 Sheets—Sheet 2.
H. B. SMITH.
STEAM TRICYCLE.
No. 398,548. Patented Feb. 26, 1889.
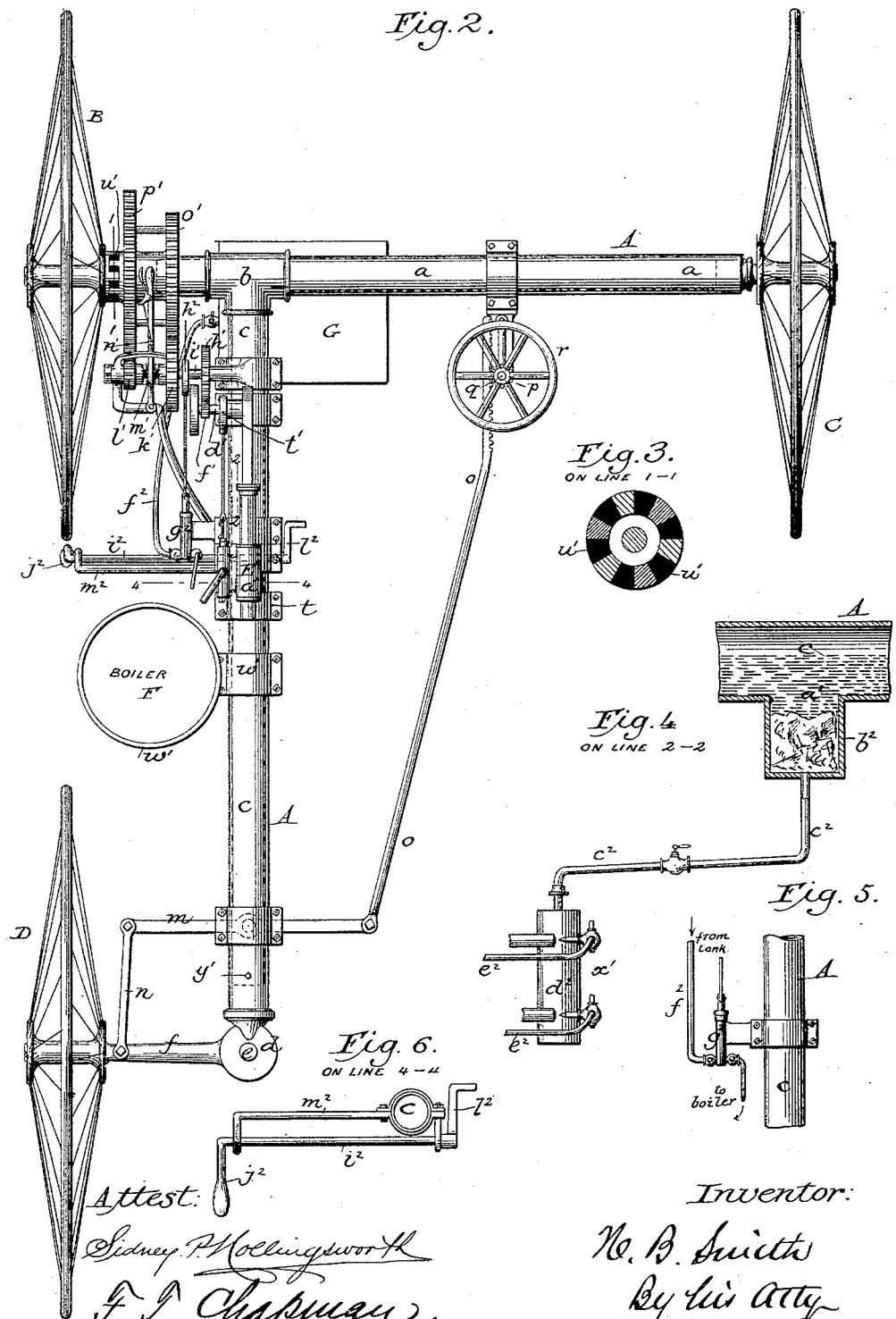

UNITED STATES PATENT OFFICE.

HEZEKIAH B. SMITH, OF SMITHVILLE, NEW JERSEY.

STEAM-TRICYCLE.

SPECIFICATION forming part of Letters Patent No. 398,548, dated February 26, 1889.

Application filed May 16, 1887. Serial No. 238,340. (No model.)

*To all whom it may concern:*

Be it known that I, HEZEKIAH B. SMITH, of Smithville, in the county of Burlington and State of New Jersey, have invented certain Improvements in Steam-Tricycles, of which the following is a specification.

The aim of my invention is to provide a light, simple, and easily-managed vehicle, which may be safely placed under the control of unskilled persons, and which shall be adapted to travel at high speeds over ordinary roads, carrying a supply of fuel and water sufficient for journeys of considerable length.

In the accompanying drawings, Figure 1 represents a perspective view of my improved vehicle. Fig. 2 is a top plan view of the same. Fig. 3 is a transverse section on the line 1 1 of Fig. 2, showing the yielding connection between the driving-wheel and its operating-gear. Fig. 4 is a vertical section on the line 2·2 of Fig. 2, showing the tubular reservoir-frame, the filter, and the connections for the burner. Fig. 5 is a view illustrating the arrangement of the feed-pump. Fig. 6 is a vertical cross-section on the line 4 4 of Fig. 2, showing the manner of supporting the brake.

Referring to the drawings, A represents the main frame of a substantially L form, and B, C, and D its supporting-wheels. The frame is composed of iron pipe or other tubular material, and consists in the present instance of the axle $a$, joined near one end by the T-shaped coupling $b$ to the reach $c$. At its two ends the axle is closed and provided with solid journals to receive the wheels B and C. At its forward end the reach is closed and provided with a forked arm, $d$, supporting the ends of a vertical pivot or journal, $e$, which in turn supports the outwardly-extending arm $f$, having its extremity fashioned into a journal or axle for the steering-wheel D, this wheel being arranged in line with the rear driving-wheel, B, the machine being of the ordinary two-track type.

The wheels may be of any suitable construction, but are preferably of the ordinary suspension type, with rubber tires now employed in bicycles and tricycles. They may be of any appropriate size; but I prefer to make the three wheels of equal size and of a diameter of from forty to fifty inches.

Around the axle I place clips or collars $g$, in which I secure by set-screws vertically-adjustable rods $h$, the upper ends of which are bent forward horizontally and passed through clips provided with set-screws on the under side of a seat, $i$, the seat being thus supported upon and directly over the axle and adapted for both horizontal and vertical adjustment, as required. To the collars $g$, I also secure downwardly-extending arms $j$, which pass through sockets or clips on the under side of a foot-rest, $k$, the sockets being provided with set-screws in order that the rest may be raised or lowered, as required.

In order that the operator occupying the seat may readily steer the machine, I pivot to a collar around the forward end of the reach a lever, $m$, connecting one end of the same by a link, $n$, to the arm which carries the steering-wheel and connecting its opposite end to a rod, $o$, which is extended rearward and provided at its rear end with a rack engaging a pinion, $p$, on a vertical shaft, $q$, which is mounted in a bracket fixed to the axle and provided on the upper end with a hand-wheel or other operating device, $r$, by which the attendant is enabled to change the position of the steering-wheel at will. These devices may, however, be replaced by any suitable connections which will enable the operator to control the front wheel, various contrivances adapted for this purpose being known in the art in connection with tricycles.

For the purpose of propelling the machine, I clasp around the reach near its rear end one or more collars, $t$, which give support to an engine, E, of the ordinary reciprocating type, which is connected through intermediate gearing with the driving-wheel B in the manner which will now be explained.

The engine-cylinder $a'$ lies horizontally and its piston is connected by the usual pitman, $b'$, to a crank, $c'$, on a cross-shaft, $d'$, this shaft-bearing being preferably formed, as usual, in an arm forming a continuation of the cylinder-head and supported at its rear end by a collar encircling the reach. The shaft $d'$ carries a pinion, $f'$, engaging a spur-gear, $h'$, on a second cross-shaft, $i'$, which receives its support from a collar clasping the reach. The shaft $i'$ carries loosely two spur-gears, $k'$ and $l'$, of different diameters, and an intermediate clutch, $m'$, splined thereto, so that it may be thrown into engagement with one or the other of the gears at will by means of a hand-lever, $n'$, provided for the purpose.

To the side of the driving-wheel I permanently connect, by devices to be presently explained, two spur-gears, $o'$ and $p'$, which engage constantly with $k'$ and $l'$, respectively. By throwing the clutch into engagement with one or the other of the gears $l'$ and $k'$ motion will be transmitted from the engine to the driving-wheel, which will receive a high or a low speed, according as the larger or the smaller of the driving-pinions is called into action. This duplex system of gearing admits of the machine being adjusted to travel at high speeds on level ground, or of its being adjusted for hill-climbing and other work requiring a greater expenditure of power. If desired, the additional gears may be omitted and a single train of gear employed between the engine and the driving-wheel.

The engine proper is of the ordinary type, with a reciprocating piston and a slide-valve, which latter is actuated by an eccentric, $t'$, on the shaft $d'$, as shown in Fig. 2.

In order to relieve the gearing from violent shocks and strains in traveling over rough ground when the driving parts are thrown suddenly in and out of gear, I interpose between the wheels $o'$ and $p'$ and the main wheel yielding connections. I prefer the construction shown in Figs. 2 and 3, in which the two wheels $o'$ and $p'$ are mounted on a sleeve revolving loosely around the main axle, the sleeve having at one end a series of fingers which enter between corresponding fingers on the hub of the wheel, with rubber or other elastic material, $u'$, inserted between them, as shown. This allows the wheel a slight rotation independently of the sleeve and driving-gear.

For the purpose of supplying steam to actuate the engine, I provide a steam-boiler, F, preferably of the upright tubular type, and support the same from the reach $c$. I recommend, as the most simple means of sustaining the boiler, an encircling ring, $w'$, the inner end of which is clipped to or around the reach, as shown.

I provide the boiler near its base with an oil-burner, $x'$, preferably of the familiar atomizing type—such as are commonly used in the well-known Shipman engines of the present day—in which a steam-jet is directed across the mouth of an oil-delivery tube, the jet acting to induce the flow of the oil through the tube and to shatter and atomize the oil and deliver it in a fine mist or spray into the fire-box, where it is burned. This burner in itself is not claimed of my invention.

The tubular frame of the machine already described serves as a reservoir for the oil used as fuel. The frame is provided with a top opening, $y'$, closed by a cock or otherwise, to permit the introduction of the oil, and is provided at any convenient point, as shown in Fig. 4, with an outlet-opening, $a^2$, through which the oil is delivered into an underlying chamber, $b^2$, filled with sponge or other fibrous or granular material to serve as a filter and to prevent the impurities which may be contained in the oil from passing to the burner. From the bottom of this filter a pipe, $c^2$, leads, as shown in Fig. 4, to a small chamber, $d^2$, in which the pipes lead to the two burners. A pipe, $e^2$, conducts steam from the boiler, and at its lower end is forked or branched, and its two ends lead to the respective burners, as shown.

For the purpose of carrying the proper supply of water, I suspend from the axle a tank or reservoir, G, which may be of any appropriate form, and from this reservoir a pipe, $f^2$, is led, as shown in Fig. 5, to a feed-pump, $g^2$, and thence to the boiler. The feed-pump, which may be of ordinary piston-type, may be supported by the plate which sustains the engine, and its piston is connected with and actuated by an eccentric, $h^2$, on the gear-shaft $i'$. The feed-pipe will be provided with the usual check-valves and a stop-valve, if desired.

In order that the operator may control the advance of the machine independently of the engine, I provide a brake consisting of a rock-shaft, $i^2$, provided at one end with a brake-shoe, $j^2$, and at the opposite end with a crank-arm, $l^2$, in position to be readily operated by the foot of the rider. This brake-shaft is sustained, as shown in Fig. 6, by plate or arm, $m^2$, clipped at one end to the reach.

While I prefer to employ the frame as an oil-reservoir and the tank as a water-reservoir, it is manifest that the water may be carried in the frame and the oil carried in the tank, the arrangement of pipes being changed to correspond.

It will be observed that under my organization or arrangement of the parts the weight of the engine-boiler and gearing and the principal part of the rider's weight are carried at the driving side of the machine, whereby the driving and steering wheels are caused to take the required hold upon the ground; that the tubular frame is utilized as a reservoir for the fuel; that the brake is in position to be conveniently operated by the foot of the rider, and that the steering and engine-controlling devices are brought in such relation to the rider's seat that they may be quickly and conveniently operated.

The location of the boiler and of the gearing on the outer side of the reach, which is in turn located near the driving-wheel, admits of the rider being seated close to the inner side of the reach and protects his person from contact with the operative parts of the mechanism, the reach being in effect employed as a guard or fender between the rider and the mechanism. The location of the boiler on the opposite side of the reach is also advantageous, not only in that the weight is brought more directly in line with the driving and steering wheels, but also in that the rider being carried out of line with the boiler is free from the annoyance which would otherwise be experienced from the heat and products of combustion. The feed-water and steam pipes may also be carried through the boiler-frame.

Having thus described my invention, what I claim is—

1. In a power-driven tricycle, the axle and its two ground-wheels, the reach extending forward rigidly from the axle, the arm F, pivoted to and extending laterally from the forward end of the reach, the connections extending rearward from said arm to control the position of the wheel, an engine or motor mounted on and sustained wholly by the reach, and intermediate gearing connecting said motor with one of the rear wheels.

2. In a two-track tricycle provided with a steam-motor, the rear axle and its two ground-wheels, one of which is a driver, the reach extending forward rigidly from said axle at a point near the driving-wheel, the steering-wheel pivotally connected with the forward end of said reach in line with the rear driving-wheel, the engine and boiler located outside of the outer side of the reach between the driving and steering wheels and connected to and sustained wholly by said reach, and the gearing connecting said engine with the driving-wheel.

3. In a steam-actuated vehicle, the axle, its two wheels, and a forwardly-extending reach, in combination with the boiler, engine, and driving-gear located on the outer side of the reach, and a driver's seat located inside of the reach, substantially as described.

4. In a steam-actuated riding-vehicle having the rear axle, its two wheels, the reach near one end of the axle and the front steering-wheel in line or substantially in line with the rear driving-wheel, the boiler and engine both carried by the reach, and intermediate gear connecting the engine with the rear wheel, as shown, whereby the motion is communicated directly to the driving-wheel and the weight of the boiler and engine applied mainly to the driving and steering wheels.

5. In a steam-tricycle, a frame provided with two independent rear wheels, one of which is the driver, and a front steering-wheel tracking with said driver, in combination with an engine or motor mounted on the reach and geared directly to the driving-wheel.

6. In combination with the non-rotating axle $a$, the driving-wheel revolving loosely thereon, a driving-gear also mounted directly on said axle and revoluble independently thereon, an elastic or yielding connection, substantially as described, between the gear and the driving wheel, and an engine or motor connected with and driving said gear on the axle, as described, whereby the wheel and its immediate driving-gear are independently supported and allowed to independently turn upon the axle.

7. The axle, its two ground-wheels, the reach extending rigidly forward from the axle, the front steering-wheel located at one side of the reach and connected to the latter by the pivoted arm or axle $f$, in combination with the lever $m$, pivoted to the reach, link $n$, rod $o$, and the rack-and-pinion mechanism for controlling said rod.

8. In combination with the tubular reservoir-frame, the boiler, its burner, the pipe connecting the frame and burner, and the filter, applied as described.

9. In combination with the driving-wheel B, the two gears $o'$ and $p'$, of different diameters, coupled thereto, the gears $k'$ and $l'$, the shaft $i'$, and its clutch $m'$, and the engine geared to shaft $i'$, substantially as shown.

10. In a steam-tricycle or road-wagon, a tubular main frame, a boiler sustained therefrom, an oil-burner for the boiler, an oil-conductor communicating with the interior of the frame and with the burner, and a steam-conductor leading from the boiler to the burner, said elements combined for joint operation, as described.

HEZEKIAH B. SMITH.

Witnesses:
E. F. BURNS,
WM. S. KELLEY.